United States Patent
Waltzer (10) Patent No.: US 6,333,686 B1
(45) Date of Patent: Dec. 25, 2001

(54) INDICATOR SENSOR FOR ANTI-WHIPLASH SYSTEM

(75) Inventor: Mark J. Waltzer, Memphis, MI (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 09/799,998

(22) Filed: Mar. 6, 2001

(51) Int. Cl.⁷ .................................................. B60Q 1/00
(52) U.S. Cl. .................. 340/438; 340/457.1; 340/463; 340/426; 340/428; 340/435; 340/551; 280/804; 280/806; 701/45; 701/46; 701/47
(58) Field of Search ................................. 340/438, 457.1, 340/463, 426, 428, 435, 551; 280/804, 806; 701/45, 46, 47

(56) References Cited

U.S. PATENT DOCUMENTS

| | | |
|---|---|---|
| 5,694,320 | 12/1997 | Breed . |
| 5,748,473 * | 5/1998 | Breed et al. .................. 364/424.055 |
| 5,765,869 * | 6/1998 | Huber .................................... 280/807 |
| 5,833,312 | 11/1998 | Lenz . |
| 6,022,074 * | 2/2000 | Swedenklef ...................... 297/216.14 |
| 6,050,637 * | 4/2000 | Haland et al. ................... 297/216.14 |
| 6,088,640 | 7/2000 | Breed . |
| 6,116,639 | 9/2000 | Breed et al. . |
| 6,184,786 * | 2/2001 | Midorikawa ....................... 340/457.1 |

* cited by examiner

Primary Examiner—Jeffery Hofsass
Assistant Examiner—Tai T. Nguyen
(74) Attorney, Agent, or Firm—Sally J. Brown (57) ABSTRACT

A system for alerting a vehicle occupant that an anti-whiplash system has been activated includes a wire disposed within an anti-whiplash system integrated into a vehicle seat. The wire is partially encased in a plastic plug which is easily inserted into a hole in the anti-whiplash system. At one end of the wire, a current generator is attached to provide a current therethrough. Also attached to the wire, at a location downstream of the anti-whiplash system, is a sensor that is configured to detect a change in the current flow through the wire. When the anti-whiplash system is activated, the moving parts shear the plastic plug and the wire contained inside, thus breaking the electrical circuit. The current sensor detects this change in current and then activates a warning signal indicator which provides notice to a vehicle occupant that the anti-whiplash system has been activated. The vehicle occupant is thus made aware that the anti-whiplash system needs to be professionally inspected to ensure continued anti-whiplash protection.

28 Claims, 7 Drawing Sheets

INDICATOR SENSOR FOR ANTI-WHIPLASH SYSTEM

BACKGROUND OF THE INVENTION

1. Field of the Invention

The present invention relates to anti-whiplash systems for use in motor vehicles and, more specifically, to an indicator sensor that alerts a vehicle occupant when an anti-whiplash system has been activated.

2. Technical Background

Whiplash related injuries are caused by the rapid acceleration of a vehicle occupant's head and cervical spine in opposite directions from one another. This typically happens in rear end, and sometimes front end, vehicle collisions. In a rear end collision, for example, an occupant's torso, being supported by the seatback, is accelerated forward, while the occupant's neck and head are quickly accelerated toward the seatback and head rest. Because of the weight of a person's head compared with the ability of the neck muscles to support it, the neck flexes posteriorly such that the head strikes the head rest before the neck. Once the occupant's head strikes the headrest, it is usually then accelerated away from the headrest as the occupant's torso reverses direction and accelerates toward the seatback. The acceleration of the head and torso in opposite directions greatly stresses the cervical spine. Typical whiplash related injuries may include fractured or dislocated vertebrae, torn ligaments, and may even result in death. Even in slow velocity impacts, the damage can be severe, oftentimes not manifesting itself until some time after the accident.

There are many devices implemented to prevent injury as occupants are thrown forward in a vehicle, including seat belts and airbags. However, there are not many devices that effectively reduce injuries as an occupant is accelerated toward the seatback. Headrests are provided, but typically fail to offer adequate protection. This is largely due to their location relative to the occupant's head and neck. Optimally, the center of the headrest should be positioned behind the head and inline with the center of gravity of the occupant's head. Too often, the headrest is too high, which forces the occupant's head downward during a collision. Alternatively, the headrest may be too low, which results in the occupant's head sliding up and over the top of the headrest which can result in hyper extension of the cervical spine which results in severe injuries.

One device for protecting a vehicle occupant during a collision is an anti-whiplash mechanism built into the vehicle seat. Such a device allows the seat to absorb some of the impact rather than translate the forces directly to the occupant. This is accomplished by designing the connection between the seatback and the seating surface to allow the seatback to slide rearward as an occupant is thrown against it. The mechanism utilizes two substantially flat plates, which overlap and are pivotally connected. One plate is attached to the seating surface, while the other is attached to the seatback. When sufficient force is applied to the seatback, the two plates are allowed to slide relative to one another such that the seatback slides rearward relative to the seating surface.

Once the anti-whiplash mechanism has been activated, the mechanism requires professional inspection and maintenance to restore the seat to its proper position and reset the anti-whiplash mechanism. However, because significant forces can be involved even during low velocity impacts, a vehicle occupant does not always know when an anti-whiplash mechanism has been activated, and therefore may not realize the mechanism is no longer able to provide anti-whiplash protection.

Additionally, other vehicle seat systems may be inplemented in a vehicle seat to further protect an occupant. These systems include systems such as All Belts to Seat (ABTS) systems, and Occupant Weight Sensors (OWS), and other similar systems. These vehicle seat systems are generally comprised of additional components. A vehicle seat may experience stresses which weaken installed vehicle systems or components of vehicle systems such that the vehicle system will no longer perform properly. However, the occupant may have no visual, audible, or other indication that the vehicle seat system has experienced stress beyond the design specifications of the vehicle seat system.

Accordingly, what is needed in the art is a device which notifies a vehicle occupant when a vehicle seat system such as an anti-whiplash device has been activated allowing the vehicle owner to have the vehicle professionally serviced to insure that the anti-whiplash mechanism is functioning properly. It would be an advancement in the art to provide such a device which provides a visible signal to the vehicle occupant. It would be another advancement in the art to provide such a device and visual signal in the form of a warning light on the dashboard of the vehicle. It would be a further advancement in the art to provide such a device which is inexpensive, easily fabricated, and conveniently installed in a vehicle.

BRIEF SUMMARY OF THE INVENTION

In order to satisfy the needs in the art identified above, the present invention provides a simple and economic solution that alerts a vehicle occupant that an anti-whiplash system has been activated and thus requires professional service. The present invention includes an indicator sensor for detecting and alerting a vehicle occupant when a vehicle seat system, such as an anti-whiplash system (AWS), has been activated. The present invention employs a filament disposed within the vehicle seat system and a flow generator connected to one end of the filament for introducing a flow through the filament. In one embodiment, the vehicle seat system is an AWS. The preferred embodiment utilizes an electrical current; however, it is readily apparent that another type of flow such as light may be used.

In one preferred embodiment, coaxial holes are formed through two overlapping plates of the anti-whiplash mechanism into which a polymeric rose_bud, or similar type of plug, encasing a small loop of the filament is inserted. When the mechanism is activated, the two overlapping plates slide relative to one another, and the plug, along with the encased loop of filament, is sheared.

The present invention will generally incorporate a sensor for detecting or measuring a property of the filament. The sensor will generally measure current, voltage, resistance, or detect the presence of light. As the polymeric plug and loop of filament are sheared, the detected property of the filament will change, whether it is a decrease in current, voltage, light, or an increase in resistance. As the sensor detects this change, it will in turn activate a warning to the vehicle occupant that the AWS has been activated. The warning may include a warning signal light in the instrument panel of the vehicle.

In an alternative embodiment of the present invention a wire carrying an electrical current is utilizing a warning indicator connected to the wire proximal the AWS. The warning indicator is connected by a wire of higher resistance than the current carrying wire. Due to the higher resistance, little current flows through the wire to the warning indicator since electrical currents tends to follow the path of least resistance. When the AWS is activated and the current_carrying wire is severed, however, the resistance within the wire increases such that the electrical current follows the higher resistance wire and activates the warning indicator. As an alternative to shearing the current_carrying wire, any action to sever the wire, such as disconnecting a plug, will achieve the same result.

Still another embodiment of the present invention provides for the polymeric plug containing a high resistance bridge across the loop of filament proximal the shearing plane of the AWS. When the loop of filament is sheared, electrical current must flow through the high resistance bridge. While not eliminating the current entirely, this change in current is easily detectable by a sensor. Additionally, this embodiment may also allow a sensor to detect a change in resistance, and should not be limited to detecting or measuring an electrical current.

These and other features, and advantages of the present invention will become more fully apparent from the following description and appended claims, or may be learned by the practice of the invention as set forth hereinafter.

BRIEF DESCRIPTION OF THE DRAWINGS

In order that the manner in which the advantages and features of the invention are obtained, a more particular description of the invention summarized above will be rendered by reference to the appended drawings. Understanding that these drawings only provide selected embodiments of the invention and are not therefore to be considered limiting of the scope, the invention will be described and explained with additional specificity and detail through the use of the accompanying drawings in which.

DETAILED DESCRIPTION OF THE INVENTION

Preferred embodiments of the invention are now described with reference to FIGS. 1–13, where like reference numbers indicate identical or functionally similar elements. The present invention, as generally described and illustrated in the Figures, may be implemented in a wide variety of configurations. Thus, the following more detailed description of the embodiments of the system and method of the present invention, as represented in the Figures, is not intended to limit the scope of the invention, as claimed, but is merely representative of presently preferred embodiments of the invention.

Figure 1:
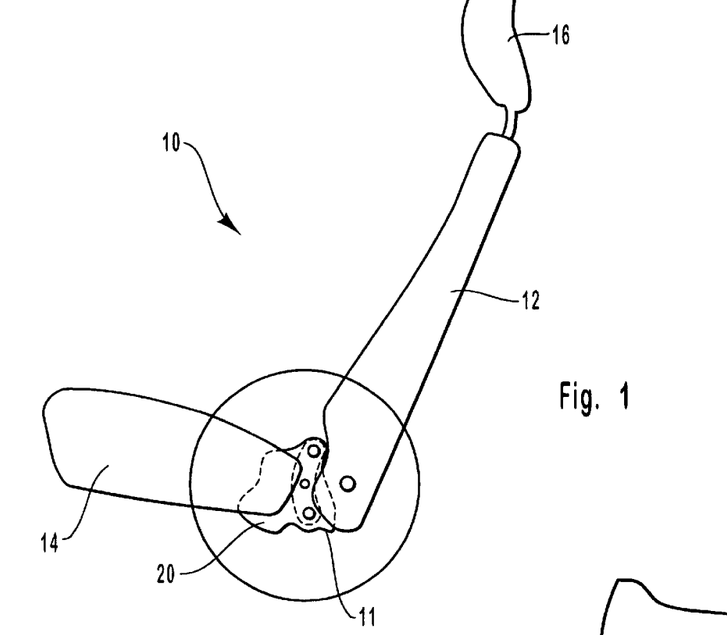
FIG. 1 is a side elevation view of an automobile seat showing the relative position of an AWS carrying the present invention.

Reference is now made to FIG. 1 wherein an automobile seat assembly, generally designated 10, is illustrated. The seat assembly 10 is comprised of a seatback 12 and a seat 14. The seatback 12 and the seat 14 are linked together in a conventional manner which may vary depending on whether the seat assembly 10 is located in the front or rear of the vehicle and whether the vehicle is a two-door vehicle or a four-door model. Also illustrated in FIG. 1 is a headrest 16 which may be formed as part of the seatback 12 or as an independent element. The seat assembly 10 is of the type generally employed in modem trucks, automobiles, and similar motor vehicles. The present invention may be employed in the environment of a seat assembly 10 of the type illustrated in FIG. 1, as well as other seat assemblies.

For purposes of this discussion, it will be assumed that the seat assembly 10 is equipped with an anti-whiplash system (AWS) 20 of the type described above. AWS's 20 are provided in order to compensate for movement of the vehicle occupant with respect to the seat assembly 10 in such a manner that a whiplash injury may occur. The AWS 20 is generally positioned in the seat 14 or is formed as part of the seat linkage 18.

As discussed above, the present invention relates to a mechanism for detecting when the AWS 20 has been activated. Since most AWS 20 systems are only effective during one usage, it is important to have a mechanism for detecting activation of the AWS 20. In many presently used AWS 20 systems, it is difficult to determine whether or not the AWS 20 has been activated. Often an activation indicator is provided, but it is located at an inconvenient location, such as beneath the seat 14 or near the bottom of the seat assembly 10. For this reason, it is difficult for the vehicle occupant to determine whether or not the AWS 20 has been activated or whether the AWS 20 is still operational. The present invention provides a convenient and simple mechanism for making this determination.

Figure 2:
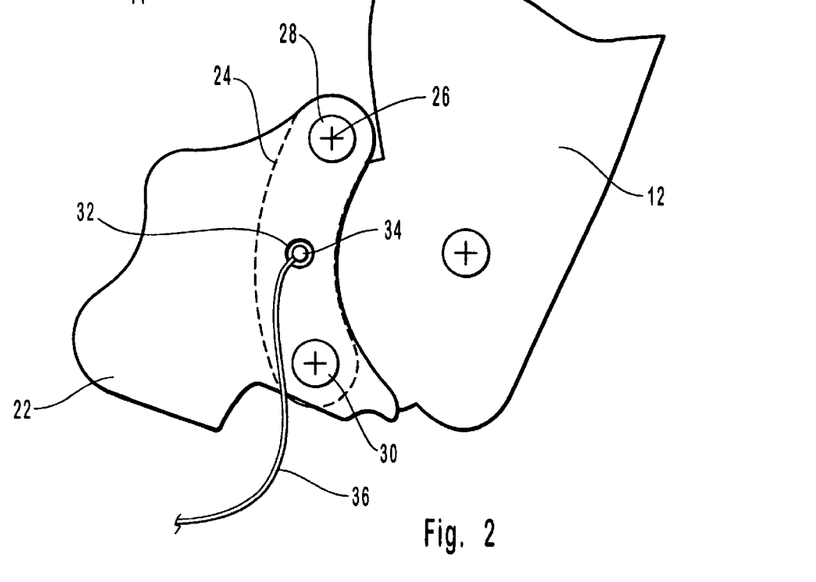
FIG. 2 is a side elevation view of the invention prior to AWS activation and filament shearing.

Referring to FIG. 2, one type of widely used AWS 20 is illustrated. The AWS 20 is comprised of an outer side plate 22 pivotally connected to a rigid link 24 at pivot point 26 by a pivot fastener 28. The rigid link 24 is connected to seatback 12 at fastener 30. There is one hole 32 formed in the outer side plate 22, and another coaxial hole 34 of slightly smaller diameter formed in rigid link 24. Also illustrated in FIG. 2 is a filament 36 which has a short loop encased by a polymeric plug (not shown in FIG. 2) that passes through hole 32 and firmly fits into hole 34. The AWS 20 is made of a suitable material to provide adequate structural properties of the seating assembly 10.

Figure 3:
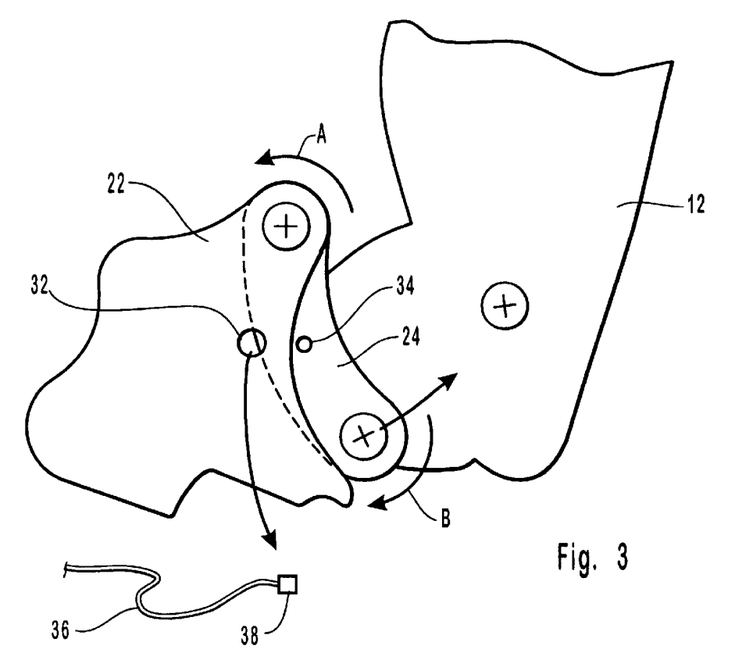
FIG. 3 is a side elevation view of the invention following activation of the AWS.

Referring now to FIG. 3, when sufficient force is applied to the seatback 12, by a collision for example, the assembly comprising the outer side plate 22, the rigid link 24, and the seatback 12, accordions out such that the rigid link 24 rotates relative to the outer side plate 22 in direction A, while the seatback 12 rotates relative to the rigid link 24 in direction B. As the outer side plate hole 32 is offset from rigid link hole 34, the resulting scissor action shears the filament 36 and its encasing plug 38. The sheared portion of the filament 36 and plug 38 is allowed to freely fall which provides a visual cue that the AWS 20 has been activated.

Figure 4:
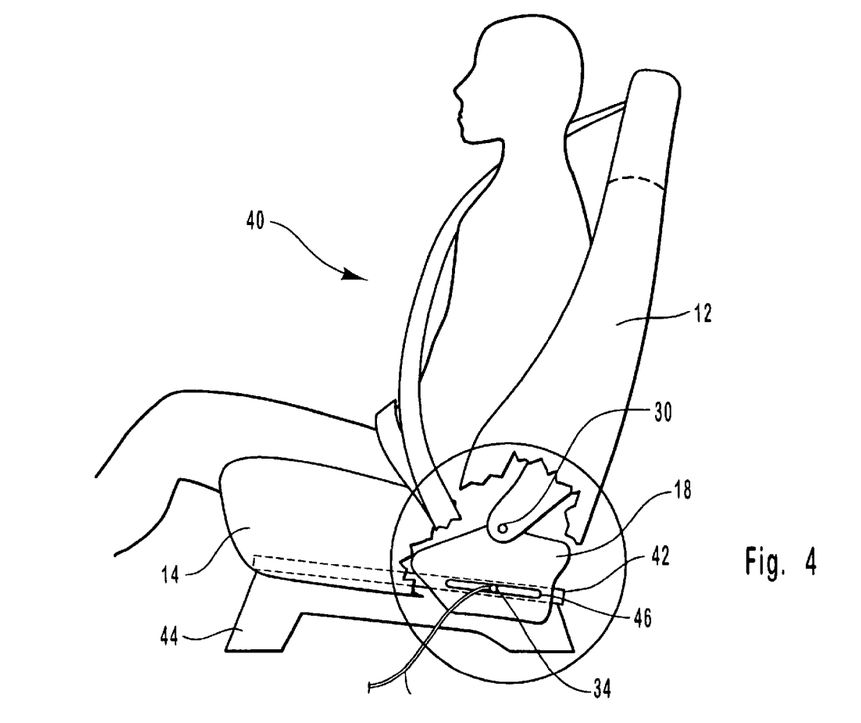
FIG. 4 is a side elevation view of a different AWS embodiment carrying the present invention prior to activation.

FIG. 4 illustrates an alternative embodiment of an AWS 20. In this embodiment, the AWS 20 is formed as part of an adjustable seat assembly 40. The adjustable seat assembly 40 is comprised of a seat 14, a seatback 12, and a seat linkage 18 which connects the seat 14 to the seatback 12 by way of fastener 30. The adjustable seat assembly 40 is further comprised of a conventional seat frame 44 secured to the floor of the vehicle and configured to support the adjustable seat assembly 40. The seat 14 and seat linkage 18 engage the seat frame 44 by way of a frame rail 42 which allows the adjustable seat assembly 40 to slide along the frame rail 42 allowing favorable positioning by a vehicle occupant. The seat frame 44 and frame rails 42 are made of conventional materials such as wood, metal, metal alloys, hard plastics, or the like.

The seat linkage 18 is configured to adjustably engage a frame rail 42 and operably provide the whiplash protection desired. A slot 46 is formed in the seat linkage 18, and a coaxial hole 34 formed in the frame rail 42. The seat linkage 18 is positioned in relation to the frame rail 42 such that the slot 46 abuts the frame rail 42. Also illustrated in FIG. 4 is a filament 36 and plug 38 that passes through slot 46 and firmly fits into hole 34. The slot 46 is configured such that the seat assembly 40 may be adjusted without shearing the plug 38. FIG. 4 illustrates the position of the seat linkage 18 prior to AWS 20 activation.

Figure 5:
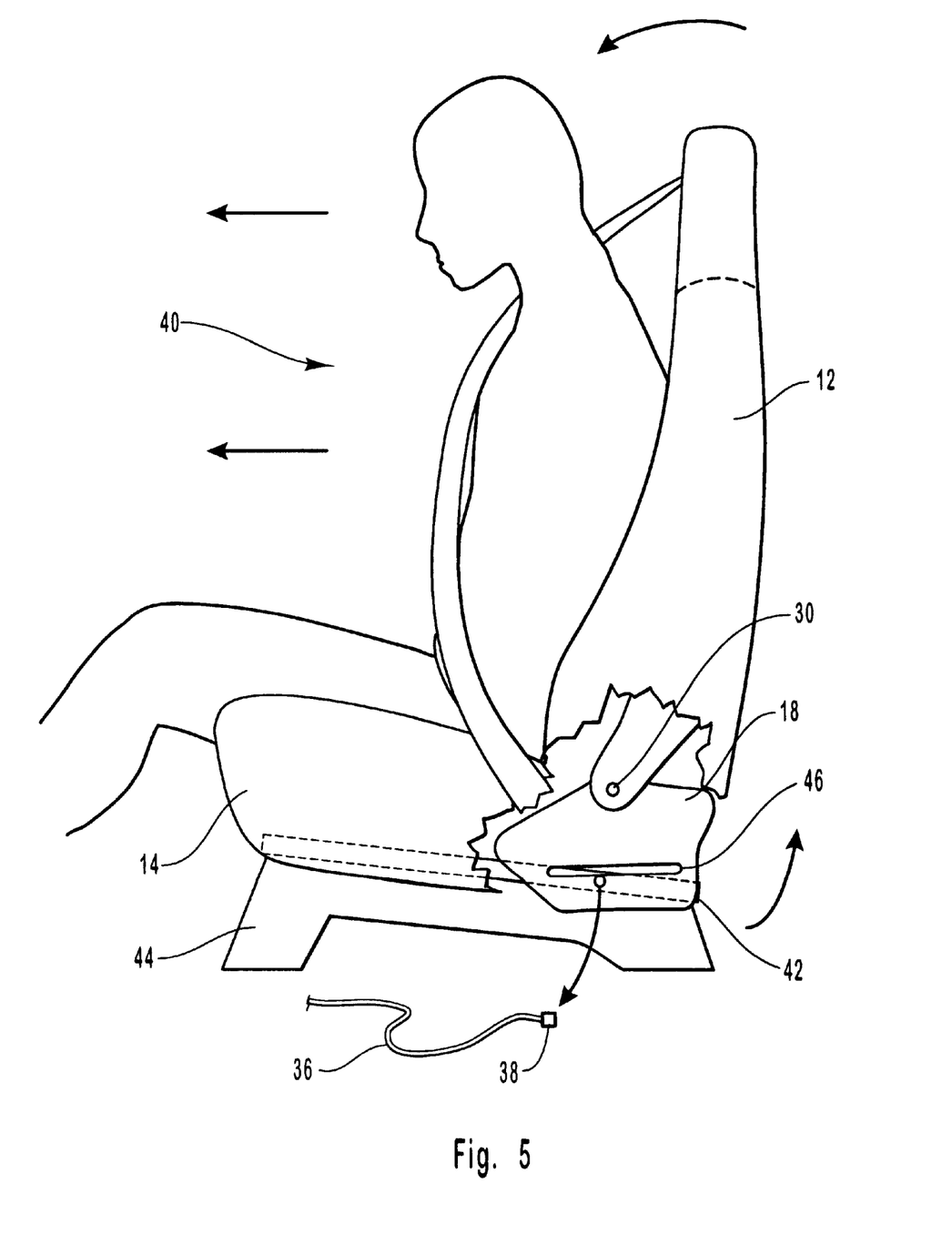
FIG. 5 illustrates the AWS of FIG. 4 following activation of the AWS.

FIG. 5 illustrates the AWS 20 embodiment of FIG. 4 positioned after it is activated. During a rear or front end collision, a seatback 12 moves forward under the forces caused by the change in acceleration. The forward motion of the seatback 12 exerts a bending moment about a seat linkage 18. The bending moment causes the rear portion of the seat linkage 18 to disconnect from the frame rail 42. As the seat linkage 18 disengages the frame rail 42, the slot 46 moves up causing a shearing force between the seat linkage 18 and frame rail 42 sufficient to shear the plug 38 and thereby the filament 36. As in FIG. 3 discussed above, the filament 36 and plug 38 then fall freely.

In alternative embodiments of the AWS 20, seat linkage 18 may pivot such that plug 38 is sheared. However, seat linkage 18 or frame rail 42 may include a stop (not shown) which halts the pivoting motion of the seat linkage 18. The stop (not shown) may also transfer the force which pivots the seat linkage 18 to the frame rail 42 such that the structure of the vehicle absorbs the remaining impact forces.

Although the present invention is described in detail in relation to an Anti-Whiplash System (AWS), it is contemplated that the invention may be used in alternative applications. The present invention may be used to detect other deformations of the seat structure resulting from a collision. For example, alternative embodiments may be used to detect deformation of All Belts to Seat (ABTS) seat assemblies (not shown). In an ABTS seat assembly the shoulder harness guide loop is anchored to the seat rather than a "B" pillar of the vehicle frame. The ABTS seat assembly receives the majority of the collision force and transfers the force to other structural components of the seat assembly. This collision force may severely deform components such that they may no longer be safely re-used. Detection of severely deformed components, such as a seat linkage 18 may be difficult or impossible for the vehicle owner or mechanic. However, installation of the present invention provides a detection mechanism which clearly indicates when the seat assembly 10 or individual structural should be replaced.

Alternatively, other structural components may deform in a collision such that other safety and restraint systems are affected. For example, a seat assembly 10 may include an Occupant Weight Sensor (OWS). The OWS is generally used to determine the size and weight of the seat occupant such that an airbag may adjust the deployment, velocity, or amount of inflation gas used to inflate airbags which protect the occupant. For example, a front passenger side seat may be equipped with a OWS which does not inflate if the occupant is under eighty pounds. This may be done to protect a child occupant. However, a collision may deform structure components which the OWS sensors are using to gauge the weight of the occupant. As a result, the OWS may receive inaccurate signals resulting in deployment of the airbag when the occupant is a child.

For this reason, the present invention may be used in conjunction with an OWS seat assembly. The present invention may detect structural deformations which would adversely affect the OWS. In one embodiment, the present invention may disable the airbag when deformations are detected. Alternatively, the present invention may notify the vehicle occupant(s) of the unsafe condition of the seat assembly.

Figure 6:
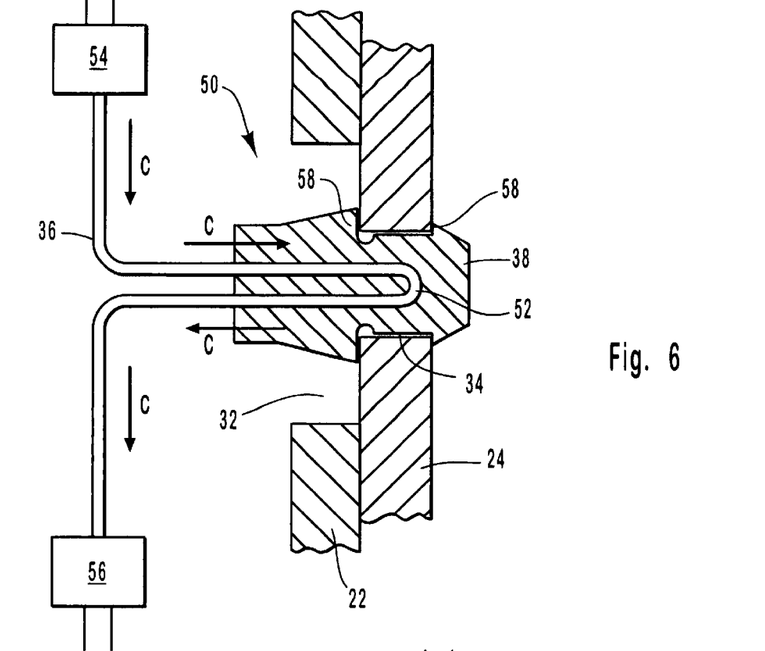
FIG. 6 is a cross-sectional view of an AWS illustrating one embodiment of the present invention prior to AWS activation.

FIG. 6 illustrates the AWS 20 as illustrated in FIGS. 1, 2, and 3 with the present invention installed prior to AWS 20 activation. An indicator sensor 50 comprises a filament 36, a filament loop 52 encased in a polymer plug 38, a flow generator 54 attached to one end of the filament 36 and a flow sensor 56 attached to the other end of the indicator sensor 50. The indicator sensor 50 is installed in an AWS 20 by passing the plug 38 through hole 32 of the outer side plate 22 and into hole 34 of the rigid link 24.

Plug 38 holds a filament loop 52 in position such that an activated AWS 20 shears the plug 38 and the filament 36 thereby interrupting a flow (the direction of which is indicated by letter C in FIG. 6.) within the filament 36. The plug 38 is made of polymers conventional in the industry such as plastic, rubber, and the like. The plug 38 is sized to fit securely in hole 34. The plug 38 may comprise securing lips 58 configured to prevent unintentional removal of the plug 38. A plug 38 encloses a portion of a filament 36 formed into a filament loop 52.

Filament 36 is a solid conduit allowing passage of energy from one end to the other. Filament 36 communicates to a flow sensor 56 the change in rate of flow of energy within the filament 36. A functional filament 36 may be made of various materials. Preferably a filament 36 is made of material which conducts electricity such as, copper, gold, other metal alloys and the like. Alternatively, a filament 36 may be used to conduct light, in which case the filament 36 is made of materials which conduct light such as glass and other fiber optic material. As a second alternative, a filament 36 may be a hollow conduit allowing passage of a fluid from one end to the other. As a hollow conduit, a filament 36 may be made of copper, plastic, rubber, or other material suitable for allowing passage of a particular fluid. The fluid may be one of many materials. For example, air, oil, water, a combination of these, or other like fluid materials.

Filament 36 is connected to a flow generator 54 on one end and a flow sensor 56 on the other. The flow generator 54 causes energy or a fluid to flow within the filament 36. A flow generator 54 is preferably a conventional apparatus such as a battery or vehicle alternator for generating flowing current. A flow generator 54 may be a laser for generating flowing light. Alternatively, a flow generator 54 may be a conventional apparatus for generating a flow of fluid such as a hydraulic pump, a fan, or other fluid flowing producing apparatus.

A flow sensor 56 monitors the rate of flow of the fluid or energy within the filament 36. A flow sensor 56 is configured to signal when a change in flow, indicative of an activated AWS 20, has occurred. The signal is delivered to a warning indicator (not shown) which notifies the vehicle occupant that the AWS 20 has been activated. A flow sensor 56 is preferably connected along the length of a filament 36 at a point between the filament loop 52 and the end of the filament 36. A flow sensor 56 may alternatively be connected to the end of the filament 36. A flow sensor 56 is generally a conventional apparatus. For example, if the filament 36 is a wire and the monitoring of the presence or absence of current is required, then a flow sensor 56 may be embodied as an amp meter. Thus, the kind of flowing material or energy and the kind of filament 36 used dictates which conventional embodiment of a flow sensor is required. Other examples include: an ohm meter to measure changes in the resistance of a filament 36 as a wire carrying electric current, an air pressure gauge for a filament 36 carrying air, a conventional light, or photon, sensor to measure presence or absence of light in a filament 36 embodied as a fiber optic cable.

A flow generator 54 and flow sensor 56 communicate by way of the filament 36 to provide effective notification of an activated AWS 20. A message between the flow generator 54 and flow sensor 56 may be simple or more complicated. A simple message indicates whether there exists a continuous conduit, filament 36, between the flow generator 54 and flow sensor 56. A continuous filament 36, allowing fluid or energy to flow, communicates that the AWS 20 has not been activated. Shearing the filament 36 on either side of the filament loop 52 communicates that the energy or fluid is no longer flowing and that the AWS 20 has been activated. A more complicated message indicates changes in resistance of flowing electrical energy or pressure of flowing fluids. Once the present invention is installed, the flow sensor 56 monitors rate of flow through the filament 36 to be at an acceptable installation level. Any change to the rate of flow causes the flow sensor 56 to signal to a warning indicator (not shown) that the AWS 20 has been activated.

The position of a flow generator 54, flow sensor 56, and filament loop 52 along a filament 36 depends largely on which type of fluid or energy will flow within the filament 36 and which property of the fluid the flow sensor 56 is to monitor.

It is expected that the most widely used embodiment of the present invention will use electricity as the flowing energy. Flowing electricity requires that the ends of the filament 36 be conductively connected. Generally in a vehicle the power source, battery or alternator, is connected such that the negative terminal connects to the frame of the vehicle and the positive terminal connects to the electrical apparatus through which the electricity is desired to flow. The electrical apparatus connects to the frame of the vehicle providing a conductive path for flowing electricity between the negative and positive terminals of the power source.

Thus, in the present invention, one end of the filament 36 connects to the positive terminal of the electrical power source (flow generator 54) and the other end connects to the frame of the vehicle. This creates a complete path, or circuit, enabling electricity to flow between the two terminals. As illustrated by letter C in FIG. 6, electricity flows within the filament 36 from the flow generator 54 toward the flow sensor 56. The electricity then flows through the flow sensor 56 and back to the flow generator 54 (completion of circuit not shown). A shearing of filament 36 anywhere in the circuit, such as by AWS 20 activation, causes electricity to stop flowing. Because the flow sensor 56 preferably measures the presence or absence of flowing electricity, the flow sensor 56 may be positioned anywhere along the circuit in this embodiment.

Alternative embodiments of the present invention may use light or fluids as the flowing medium and thereby do not require a completed circuit to function. In these embodiments the flow sensor 56 may measure one or both of two properties, either presence/absence of flow or change in pressure of flow. These two properties are best understood by examining an embodiment using light and an embodiment using air as the flowing medium.

Figure 7:
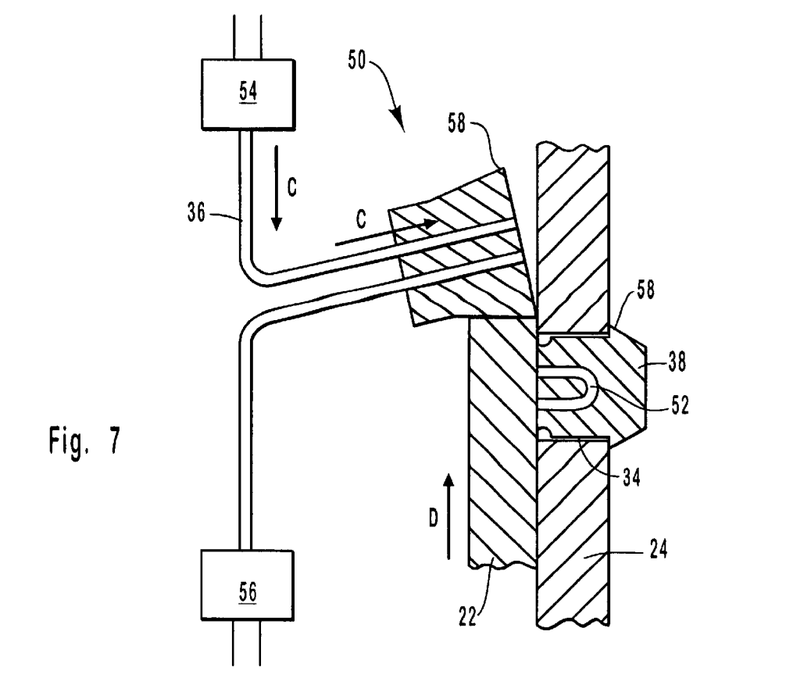
FIG. 7 is a cross-sectional view of an AWS illustrating the present invention after AWS activation.

Referring now to FIG. 7, the configuration of members of the present invention discussed in relation to FIG. 6 is illustrated after activation of the AWS 20. As discussed above, activation of the AWS 20 causes shearing of the filament loop 52 from the filament 36. This shearing changes the flow of electrical current within the filament 36 which is detectable by the flow sensor 56. Upon such detection by the flow sensor 56, the flow sensor 56 activates a warning indicator (not shown). Activation of the warning indicator signals the vehicle occupant that the seating assembly may be damaged and thus requires professional inspection and/or repair. The warning indicator may be a visual indicator such as a "service seat" lamp mounted in the dash board or may be an audible warning.

Also illustrated in FIG. 7 is the direction of motion D of the outer side plate 22 from a position prior to AWS 20 activation seen in FIG. 6 to a position after AWS 20 activation. As the seating assembly 10 is dislocated during a collision, the outer side plate 22 moves in direction D relative to the rigid link 24 and generates shear forces which sever the plug 38 along with the encased filament loop 52, which in turn interrupts the flow through the filament 36.

Figure 8:
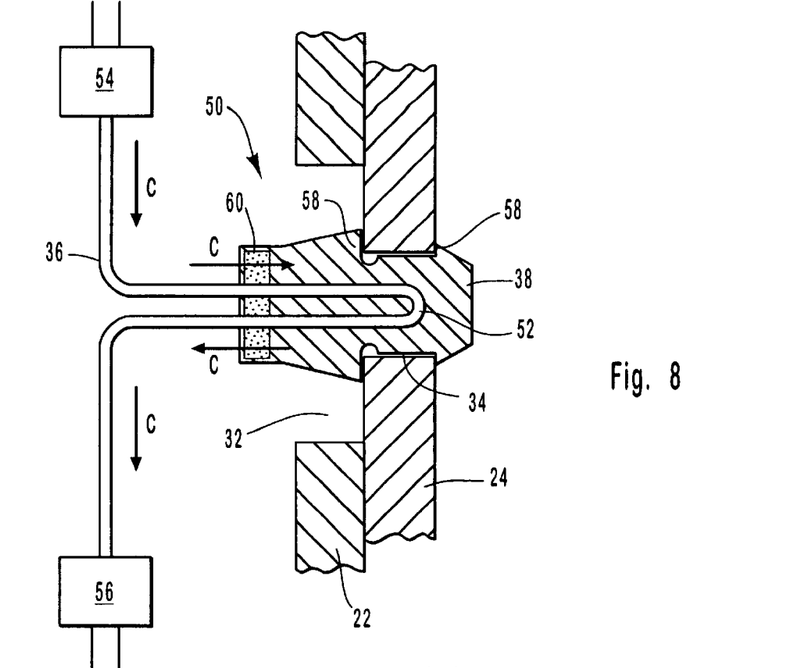
FIG. 8 is a cross-sectional view of an AWS illustrating a second embodiment of the present invention prior to AWS activation.

FIG. 8 illustrates another embodiment of the present invention wherein electricity is preferably the flowing medium, and the filament 36 is made of conductive material of low electrical resistance. Within the plug 38 a filament 36 is connected by way of a high-resistance bridge 60 between two points on the filament 36 which are not inside hole 34. The bridge 60 is sized to be encased by the plug 38. Electricity flows along paths of least resistance. The bridge 60 and the filament 36 are made of two conductive materials such that resistance of the bridge 60 is higher than that of the filament 36. Generally, the filament 36 is made of copper. Conductive material with a resistance higher than material generally used in filaments 36 includes steel, aluminum, mercury, and the like. FIG. 8 also illustrates the direction of current flow by arrows C. The size of arrows C illustrates the rate of flow of electricity.

Figure 9:
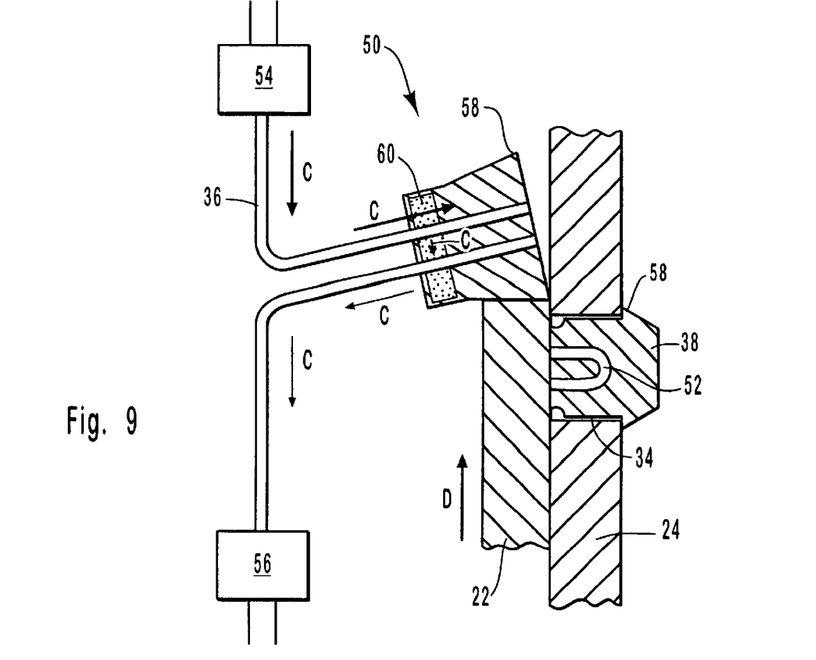
FIG. 9 is a cross-sectional view of an AWS of FIG. 8 illustrating the second embodiment of the present invention after AWS activation.

FIG. 9 illustrates the embodiment illustrated in FIG. 8 after activation of the AWS 20. Current C continues to flow between the flow generator 54 and the flow sensor 56, but must pass through the bridge 60 because the filament loop 52 has been sheared from the filament 36. Severing the plug 38 causes the bridge 60 to become the path of least resistance when compared to air touching the severed end of the filament 36. Passing the current C through the bridge 60 changes the flow of electricity C as illustrated by the smaller arrows C from the point of shearing to the flow sensor 56. The flow sensor 56 detects the change in filament 36 properties and activates the warning indicator (not shown). The filament 36 properties detected by the flow sensor 56 may include any of a number of electrical properties, all of which fall within the scope of the present invention. As in FIG. 7, arrow D illustrates the direction of motion D of the outer side plate 22.

Figure 10:
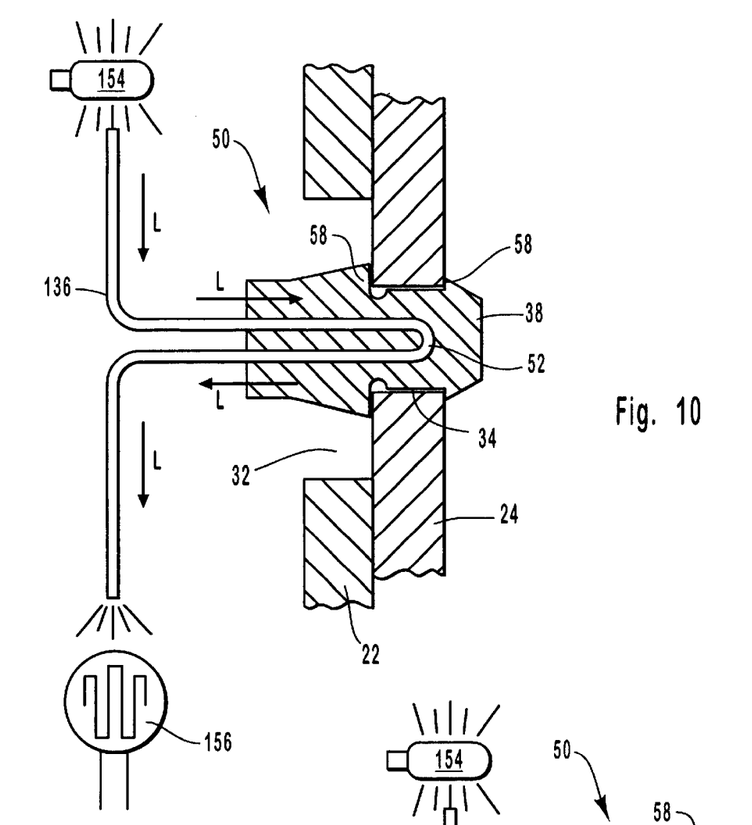
FIG. 10 is a cross-sectional view of an AWS illustrating a third embodiment of the present invention prior to AWS activation.

FIG. 10 illustrates an embodiment in which light is the flowing medium. In such an embodiment positioning of the flow sensor 156 relates directly to operability of the present invention. The flow sensor 156 preferably measures the presence or absence of light. With the flow generator 154 connected to a filament 136, as illustrated in FIG. 10, flowing light is produced by a flow generator 154 emitting photons of light within the filament 136 toward the other end of the filament 136. A shearing of the filament 136 causes the light to exit the filament 136 at a shear point (not shown). The point of shearing is the portion of the filament 136 which is sheared when an AWS 20 is activated, as discussed above. The portion of filament 136 encased within the plug 38 is representative of the shear point. No light flows from the shear point to the other end. Still referring to FIG. 10, if the flow sensor 156 is positioned between the plug 38 and the flow generator 154 the flow sensor 156 does not measure a change in light flow indicative of a shearing of the filament 136. Therefore, in such an embodiment the flow sensor 156 must be positioned between the plug 38 and the other end of the filament 136.

The embodiment of the present invention in FIG. 10 is similar in all but three respects to FIG. 6. In FIG. 10, the flow generator 54 of FIG. 6 is embodied as a light generator 154. Light generators 154 may be a laser, light bulb, LED, or the like. The flow sensor 56 of FIG. 6 is embodied as a light sensor 156 configured to sense changes in properties of light. Conventional light sensors allow detection of the absence or presence of light or the intensity of the light. The filament 136 in this particular embodiment is configured to conduct light, such as an optic fiber.

Figure 11:
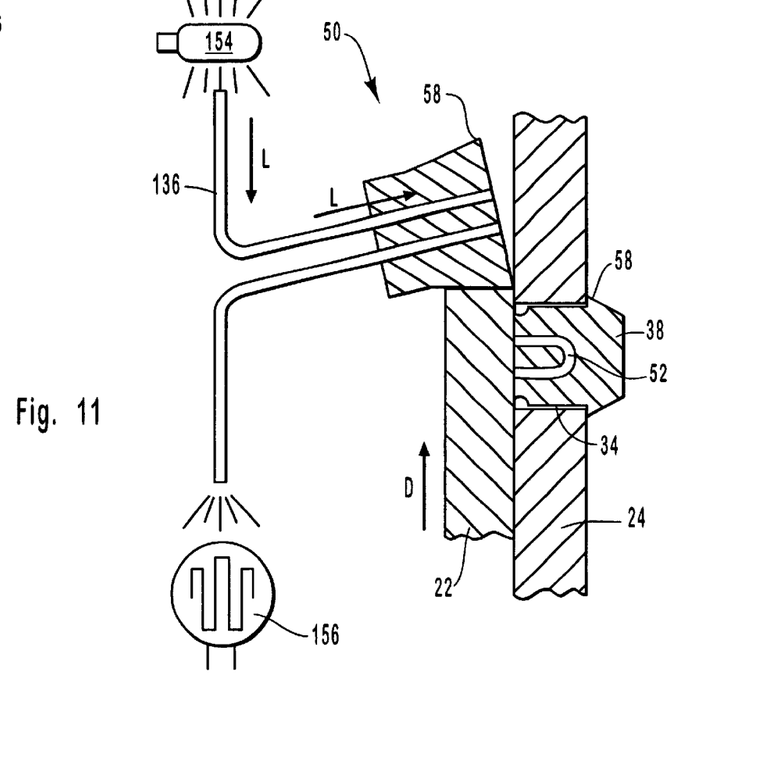
FIG. 11 is a cross-sectional view of the AWS of FIG. 10 illustrating the third embodiment of the present invention after AWS activation.

FIG. 11 illustrates the embodiment illustrated in FIG. 10 after activation of the AWS 20. As the outer side plate 22 slides relative to the rigid link 24, the plug 38 and its encased filament loop 52 are severed, which interrupts the flow of light, arrow L, through the filament 136. Upon interruption of the transmission of light through the filament 136, the flow sensor 156 detects this interruption and activates the warning indicator (not shown). As in FIG. 7, arrow D illustrates the direction of motion D of the outer side plate 22.

Figure 12:
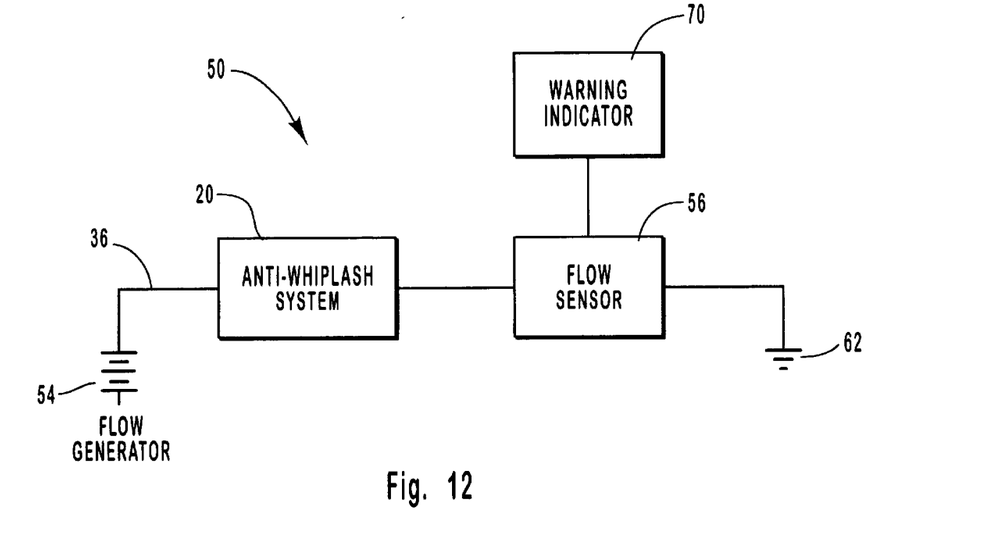
FIG. 12 is a schematic diagram showing the relative position of the components which make up one embodiment of the present invention.

FIG. 12 is a schematic diagram of an indicator sensor 50 falling within the scope of the present invention. A flow generator 54 introduces a flow of electrical current through a filament 36, which is attached to an AWS 20. A flow sensor 56 is attached to the filament 36 distal the AWS 20 and detects the flow carried through the filament 36. Filament 36 also connects the flow sensor 56 to a ground connection 62 to complete an electrical circuit. A warning indicator 70 is attached to the flow sensor 56. Upon activation of the AWS 20, the change in flow characteristics through the filament 36 is detected by the flow sensor 56 which activates the warning indicator 70 to alert a vehicle occupant that the AWS 20 has been activated. The warning indicator may be a buzzer, a lamp, a voice warning, an LCD display or the like. In a preferred embodiment, the warning indicator 70 is a visual "service seat" lamp mounted in the instrument panel of the vehicle.

Figure 13:
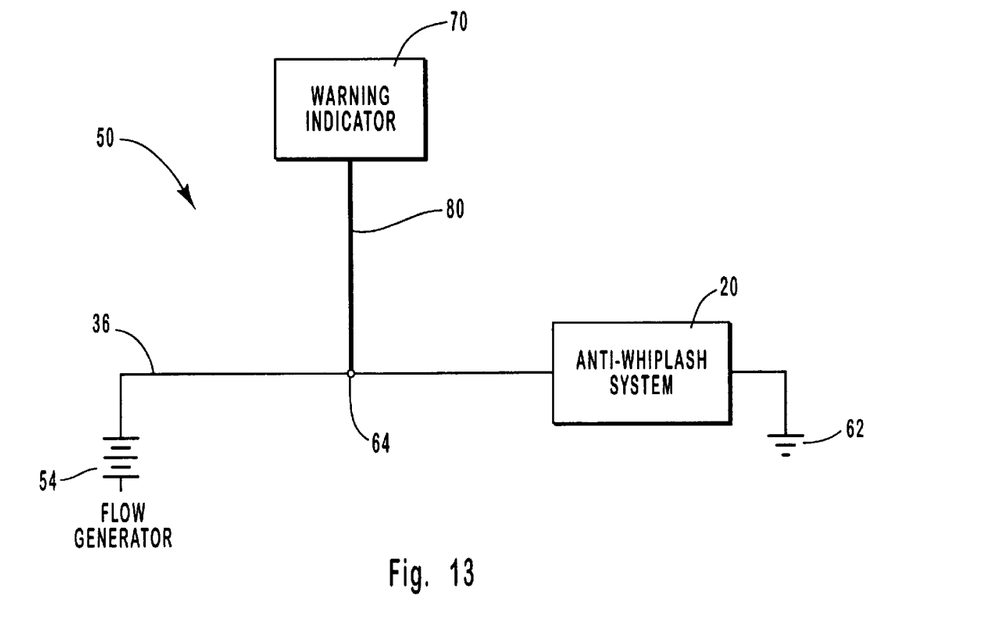
FIG. 13 is a schematic diagram of another embodiment of the present invention showing the components and their relative position within the system.

FIG. 13 is a schematic diagram representing an alternative embodiment of an indicator sensor 50 falling within the scope of the present invention. A filament 36 having low resistance which conducts electricity connects a flow generator 54 to an AWS 20. Filament 36 also connects the AWS 20 to a ground connection 62 to complete an electrical circuit. A flow generator 54 introduces an electrical current through a filament 36. A warning indicator 70 is connected to the filament 36 proximal the AWS 20 at filament connection point 64 by way of a high-resistance wire 80. The warning indicator 70 is also connected to a ground connection (not shown). High-resistance wire 80 need only have a resistance slightly higher than the resistance of the filament 36, since electricity follows the path of least resistance. Materials which may be used to fabricate the high-resistance wire 80 include steel, aluminum, mercury, and the like. The resistivity of the high-resistance wire 80 prevents electricity from flowing through the high-resistance wire 80 until the AWS 20 is activated. Prior to AWS 20 activation, the electricity flows in the filament 36 because that is the path of least resistance. Upon activation of the AWS 20, the filament 36 is severed which causes the electrical path from the filament connection point 64 to present higher resistance than the high-resistance wire 80. Therefore, the electricity flows in the high-resistance wire 80 and activates the warning indicator 70. This alternative embodiment does not require a flow sensor 56, but requires an electrical flow of sufficient voltage and current to activate the warning indicator 70 following activation of the AWS 20.

The present invention and more particularly the warning indicator 70 provides an effective apparatus for notifying a vehicle occupant that an anti-whiplash system (AWS) 20 has been activated. The present invention includes a wire, filament 36, disposed within an AWS such that activation of the anti-whiplash system severs the wire. The wire is part of an electrical circuit which includes a current generator, flow generator 54, and a current sensor, flow sensor 56, which detects a change in current flow through the wire. The current sensor activates a warning signal indicator 70 which provides notice to a vehicle occupant that the anti-whiplash system has been activated. The vehicle occupant is thus made aware that the anti-whiplash system needs to be professionally inspected to ensure continued anti-whiplash protection.

The present invention may be embodied in other specific forms without departing from its scope or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A system for alerting a vehicle occupant that a vehicle seat system has experienced stress beyond its design specifications for the seat system, comprising;

a filament disposed within a vehicle seat system and placed such that activation of said vehicle seat system severs said filament, activating a warning to alert a vehicle occupant that said vehicle seat system has experienced stress beyond its design specifications.

2. The system of claim 1, further comprising a plug encasing a length of said filament and configured to be installed into said vehicle seat system.

3. The system of claim 2, wherein said plug is a polymeric plug.

4. The system of claim 1, wherein said vehicle seat system comprises an anti-whiplash system.

5. The system of claim 1, wherein said vehicle seat system comprises an all belts to seat system.

6. The system of claim 1, wherein said vehicle seat system comprises an occupant weight sensor system.

7. The system of claim 1, wherein said filament is a metal wire.

8. The system of claim 1, wherein said filament is an optical fiber.

9. The system of claim 1, further comprising a flow generator connected to said filament proximal said vehicle seat system and configured to introduce a flow therethrough.

10. The system of claim 9, wherein said flow is electricity.

11. The system of claim 9, wherein said flow is light.

12. The system of claim 1, further comprising a flow sensor attached to said filament distal said vehicle seat system, and configured to detect a change in the flow through said filament, and capable of activating a warning upon such detection.

13. A system for alerting a vehicle occupant that an anti-whiplash system has been activated, comprising;
   a current generator attached to a current-conducting wire proximal an anti-whiplash system for providing an electrical current therethrough;
   said wire disposed within said anti-whiplash system such that activation of said anti-whiplash system causes a change in current flow through said wire;
   a warning signal indicator connected to said wire such that a change in current flow through said wire activates said indicator which activation indicates that said anti-whiplash system has been activated.

14. The system of claim 13, wherein said warning signal indicator is connected to said wire proximal said anti-whiplash system by a second wire having a resistance higher than said wire such that no current initially flows through said second wire.

15. The system of claim 13, further comprising a flow sensor connected to said wire distal said anti-whiplash system for sensing said current therethrough.

16. The system of claim 15, wherein said flow sensor activates said warning signal indicator upon sensing a change in said flow through said wire.

17. The system of claim 16, wherein said warning indicator is a visual indicator.

18. The system of claim 16, wherein said warning indicator is an audible signal.

19. The system of claim 16, further comprising a polymeric p lug configured to carry a portion of said wire and configured to be installed into said anti-whiplash system such that activation of said anti-whiplash system shears said plug and the wire contained therein.

20. A system for alerting a vehicle occupant that an anti-whiplash system has been activated, comprising;
   a current-conducting wire configured such that it is capable of being placed within an anti-whiplash system in such a manner that activation of the anti-whiplash system severs said wire;
   a current generator attached to said wire proximal said anti-whiplash system for providing an electrical current therethrough;
   a sensor attached to said wire distal said anti-whiplash system for sensing a change in said electrical current therethrough.

21. A method for detecting when an automobile seat's anti-whiplash system has been activated comprising the steps of:
   providing an anti-whiplash system integrated into a vehicle seat;
   providing a filament within said anti-whiplash system and configured such that activation of said anti-whiplash system severs said filament;
   applying a flow through said filament;
   connecting a sensor to said filament to detect said flow therethrough.

22. The method of claim 21, further comprising activating a warning upon said sensor's detection of flow change through said filament.

23. The method of claim 21, wherein said filament is a metal wire.

24. The method of claim 21, wherein said filament is an optical fiber.

25. The method of claim 21, wherein said flow is electricity.

26. The method of claim 21, wherein said flow is light.

27. The method of claim 21, wherein said warning is a visual indicator.

28. The method of claim 21, wherein said warning is an audible indicator.

* * * * *